United States Patent
Nowak et al.

(10) Patent No.: US 9,680,277 B2
(45) Date of Patent: Jun. 13, 2017

(54) SLAB AMPLIFIER, AND LASER APPARATUS AND EXTREME ULTRAVIOLET LIGHT GENERATION APPARATUS INCLUDING SLAB AMPLIFIER

(71) Applicant: Gigaphoton Inc., Tochigi-ken (JP)

(72) Inventors: Krzysztof Nowak, Tochigi-ken (JP); Takashi Suganuma, Tochigi-ken (JP); Takashi Saito, Tochigi-ken (JP); Yasufumi Kawasuji, Tochigi-ken (JP)

(73) Assignee: Gigaphoton Inc., Tochigi-ken (JP)

( * ) Notice: Subject to any disclaimer, the term of this patent is extended or adjusted under 35 U.S.C. 154(b) by 0 days.

(21) Appl. No.: 14/657,640

(22) Filed: Mar. 13, 2015

(65) Prior Publication Data

US 2015/0188277 A1 Jul. 2, 2015

Related U.S. Application Data

(63) Continuation of application No. PCT/JP2013/073976, filed on Sep. 5, 2013.

(30) Foreign Application Priority Data

Sep. 18, 2012 (JP) .................. 2012-205062
Sep. 18, 2012 (JP) .................. 2012-205063
Sep. 18, 2012 (JP) .................. 2012-205064

(51) Int. Cl.
*H01S 3/034* (2006.01)
*H01S 3/07* (2006.01)
(Continued)

(52) U.S. Cl.
CPC .............. *H01S 3/034* (2013.01); *H01S 3/076* (2013.01); *H01S 3/2232* (2013.01);
(Continued)

(58) Field of Classification Search
CPC ...... H01S 3/034; H01S 3/2232; H01S 3/2325; H01S 3/2366; H01S 3/076
See application file for complete search history.

(56) References Cited

U.S. PATENT DOCUMENTS 3,717,823 A * 2/1973 Abdale .................. H01S 3/034
359/894
3,895,313 A * 7/1975 Seitz ....................... H01S 3/034
372/102
(Continued)

FOREIGN PATENT DOCUMENTS

JP 56-137689 A 10/1981
JP 02-312288 A 12/1990
(Continued)

OTHER PUBLICATIONS

International Search Report PCT/JP2013/073976 dated Dec. 3, 2013 with English translation.

*Primary Examiner* — Eric Bolda
(74) *Attorney, Agent, or Firm* — Studebaker & Brackett PC

(57) ABSTRACT

There is provided a slab amplifier including an optical system (48, 51) provided in a chamber (47) to allow a seed beam having entered from a first window into the space between a pair of electrodes (42, 43) to be repeatedly reflected between the space so that the seed beam is amplified to be an amplified beam; a first aperture plate (61) provided between the first window and the electrodes, and having an opening of a dimension equal to or greater than a cross-section of the seed beam and equal to or smaller than a dimension of the first window; and a second aperture plate (62) provided between the second window and the electrodes, and having an opening of a dimension equal to or
(Continued)

greater than a cross-section of the amplified beam and equal to or smaller than a dimension of the second window.

3 Claims, 18 Drawing Sheets

(51) Int. Cl.
  *H01S 3/09* (2006.01)
  *H01S 3/23* (2006.01)
  *H01S 3/223* (2006.01)
  *H01S 3/22* (2006.01)
  *H01S 3/0971* (2006.01)
  *H01S 3/03* (2006.01)
  *H05G 2/00* (2006.01)

(52) U.S. Cl.
  CPC .......... *H01S 3/2366* (2013.01); *H01S 3/03* (2013.01); *H01S 3/0971* (2013.01); *H01S 3/2316* (2013.01); *H01S 3/2325* (2013.01); *H01S 3/2375* (2013.01); *H01S 2301/02* (2013.01); *H05G 2/008* (2013.01)

(56) References Cited

U.S. PATENT DOCUMENTS

| | | | |
|---|---|---|---|
| 4,685,110 A * | 8/1987 | DeBell | H01S 3/034 372/101 |
| 5,386,431 A | 1/1995 | Tulip | |
| 6,370,178 B1 * | 4/2002 | Papayoanou | H01S 5/028 372/49.01 |
| 6,424,666 B1 | 7/2002 | Stamm | |
| 6,426,966 B1 | 7/2002 | Basting et al. | |
| 6,560,254 B2 | 5/2003 | Stamm | |
| 6,717,973 B2 | 4/2004 | Basting et al. | |
| 6,795,474 B2 | 9/2004 | Partlo et al. | |
| 8,535,807 B2 | 9/2013 | Kurihara | |
| 8,804,778 B2 | 8/2014 | Wakabayashi et al. | |
| 2002/0018505 A1 | 2/2002 | Basting et al. | |
| 2002/0075932 A1 | 6/2002 | Stamm | |
| 2002/0105994 A1 | 8/2002 | Partlo et al. | |
| 2008/0144671 A1 * | 6/2008 | Ershov | G03F 7/70583 372/5 |
| 2010/0193710 A1 | 8/2010 | Wakabayashi et al. | |
| 2010/0195196 A1 | 8/2010 | Nowak et al. | |
| 2011/0244224 A1 | 10/2011 | Kurihara | |

FOREIGN PATENT DOCUMENTS

| | | |
|---|---|---|
| JP | 4-223382 A | 8/1992 |
| JP | 06-152005 A | 5/1994 |
| JP | 08-306999 A | 11/1996 |
| JP | 11-087807 A | 3/1999 |
| JP | 2002-009378 A | 1/2002 |
| JP | 2002-094160 A | 3/2002 |
| JP | 2003-513437 A | 4/2003 |
| JP | 2003-204104 A | 7/2003 |
| JP | 2004-528718 A | 9/2004 |
| JP | 2005-223295 A | 8/2005 |
| JP | 2009-026854 A | 2/2009 |
| JP | 2010-171375 A | 8/2010 |
| JP | 2010-186990 A | 8/2010 |
| JP | 2011-221048 A | 11/2011 |

* cited by examiner

SLAB AMPLIFIER, AND LASER APPARATUS AND EXTREME ULTRAVIOLET LIGHT GENERATION APPARATUS INCLUDING SLAB AMPLIFIER

CROSS-REFERENCES TO RELATED APPLICATIONS

This application claims the benefit of Japanese Patent Application No. 2012-205062, filed Sep. 18, 2012, Japanese Patent Application No. 2012-205063, filed Sep. 18, 2012 and Japanese Patent Application No. 2012-205064, filed Sep. 18, 2012, which are incorporated herein by reference.

BACKGROUND

1. Technical Field

The present disclosure relates to a slab amplifier, and a laser apparatus and an extreme ultraviolet (EUV) light generation apparatus including the slab amplifier.

2. Related Art

A lithography apparatus used to, for example, produce integrated circuits transfers a desired pattern on a substrate. In order to create a circuit pattern on the substrate, a patterning device referred to as "mask" or "reticle" is used. The pattern is transferred to the substrate by imaging the pattern on a radiation-sensitive material (resist) layer provided on the substrate (e.g. silicon wafer substrate).

The theoretically estimated CD (critical dimension) of the pattern transfer is given by the following equation (1).

$$CD = k1 \cdot \lambda / NA \quad (1)$$

Here, $\lambda$ represents the wavelength of exposure light used in the pattern transfer. NA represents the numerical aperture of a projection system used in the pattern transfer, $k1$ represents a process-dependent coefficient referred to as "Rayleigh constant", and CD represents a printed critical dimension. As seen from Equation (1), a reduction in the transferable pattern size is achieved by one of the following ways: shortening the wavelength $\lambda$ for exposure; increasing the numerical aperture NA; and reducing the value of $k1$.

In order to shorten the wavelength for exposure and therefore to reduce the transferable pattern size, there has been proposed to use an EUV light generation apparatus that generates EUV light at a wavelength within the range from 10 nm to 20 nm, preferably from 13 nm to 14 nm. As a typical EUV light generation apparatus, there has been known a laser produced plasma (LPP) EUV light generation apparatus, a discharge plasma EUV light generation apparatus, and synchrotron radiated EUV light generation apparatus by using an electron storage ring.

Usually, in the LLP EUV light generation apparatus, Sn droplets are irradiated with a laser beam and turned into plasma, and therefore light at a wavelength within the EUV band is generated. This laser beam may be supplied by, for example, a $CO_2$ laser apparatus.

CITATION LIST

Patent Literature

PTL1: Japanese Patent Application Laid-Open No. 2010-186990
PTL2: U.S. Pat. No. 5,386,431
PTL3: Japanese Patent Application Laid-Open No. 2009-26854

SUMMARY

According to one aspect of the present disclosure, a slab amplifier configured to receive a seed beam outputted from a seed light source and to amplify the seed beam includes: a chamber having a first through-hole and a second through-hole and accommodating a laser gain medium; a first window provided to seal the first through-hole; a first window holder configured to hold the first window; a second window provided to seal the second through-hole; a second window holder configured to hold the second window; a pair of plate electrodes disposed to face one another with a predetermined space in the chamber; an optical system provided in the chamber to allow the seed beam having entered from the first window into the space between the pair of electrodes to be repeatedly reflected between the space while the seed beam travels through the space, and to be outputted through the second window, so that the seed beam is amplified to be an amplified beam; and a first aperture plate provided between the first window and the electrodes, and having an opening of a dimension equal to or greater than a cross-section of the seed beam and equal to or smaller than a dimension of the first window; and a second aperture plate provided between the second window and the electrodes, and having an opening of a dimension equal to or greater than a cross-section of the amplified beam and equal to or smaller than a dimension of the second window.

BRIEF DESCRIPTION OF THE DRAWINGS

Hereinafter, selected embodiments of the present disclosure will be described with reference to the accompanying drawings.

DESCRIPTION OF EXEMPLARY EMBODIMENTS

Figure 1:
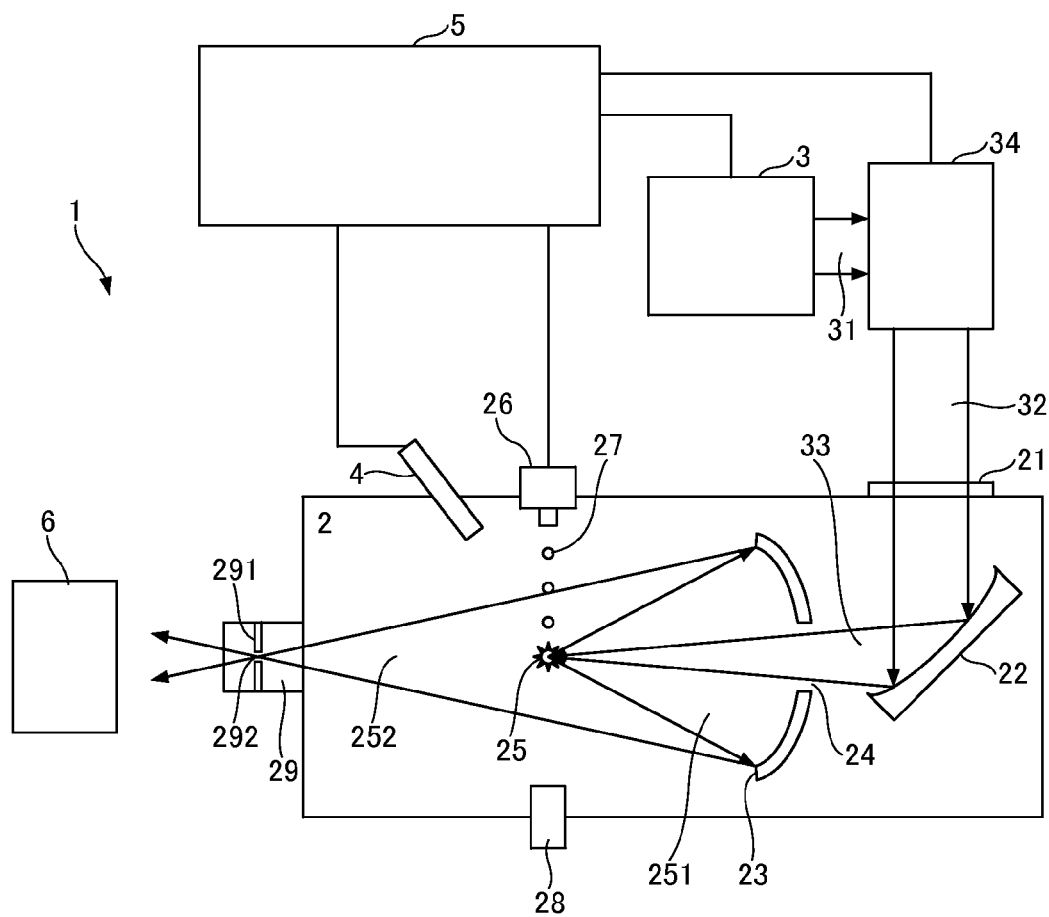
FIG. 1 schematically shows an exemplary configuration of a laser produced plasma (LPP) EUV light generation apparatus according to one embodiment of the present disclosure.

Contents
1. Overview of EUV Light Generation Apparatus
1.1 Configuration
1.2 Operation
2. Slab amplifier
2.1 Configuration
2.2 Operation
2.3 Problem
3. Slab amplifier configured to prevent self-oscillation
3.1 Installation of aperture plate to regulate laser beam
3.2 Angle of installation of holder including window to reduce reflected light incident on discharge region
3.3 Installation of container to absorb reflected light
3.4 Installation of labyrinth
4. Application of slab amplifier
4.1 Regenerative amplifier including slab amplifier
4.2 EUV light generation apparatus including slab amplifier Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview of EUV Light Generation Apparatus
1.1 Configuration

FIG. 1 schematically shows an exemplary configuration of a laser produced plasma EUV light generation apparatus (herein after referred to as "LPP EUV light generation apparatus") according to one embodiment of the present disclosure. An LPP EUV light generation apparatus 1 may be used with at least one laser apparatus 3. Hereinafter, a system including the LPP EUV light generation apparatus 1 and the laser apparatus 3 may be referred to as an EUV light generation system. As shown in FIG. 1 and described in detail below, the LPP EUV light generation apparatus 1 may include a chamber 2. The chamber 2 may preferably be in a vacuum state. Alternatively, gas with high transmittance to EUV light may exist in the chamber 2. In addition, the LPP EUV light generation apparatus 1 may further include a target supply system. The target supply system may be, for example, a droplet generator 26. The target supply system may be mounted onto, for example, the wall of the chamber 2. A target material to be supplied by the target supply system may include, but is not limited to, tin, lithium, xenon, or any combination thereof.

The chamber 2 may have at least one through-hole formed in its wall. The through-hole may be closed by a window 21. An EUV light collector mirror 23 having a reflecting surface, such as a spheroidal surface, may be provided in the chamber 2. The EUV light collector mirror 23 having the spheroidal surface may have a first focus and a second focus. The EUV light collector mirror 23 may have a multi-layered reflective film formed on the spheroidal surface thereof. The reflective film may include a molybdenum layer and a silicon layer, which are alternately laminated. It is preferred that the EUV light collector mirror 23 is positioned such that the first focus lies in a plasma generation site 25 from which plasma is generated or the vicinity thereof, and the second focus lies in an intermediate focus (IF) 292 on which the EUV light reflected by the EUV light collector mirror 23 is focused. The EUV light collector mirror 23 may have a through-hole 24 formed at the center thereof so that a pulse laser beam 33 may pass through the through-hole 24.

Referring to FIG. 1 again, the LPP EUV light generation apparatus 1 may include an EUV light generation control system 5. In addition, the LPP EUV light generation apparatus 1 may include a target imaging device 4.

The LPP EUV light generation apparatus 1 may further include a communicating tube 29 that allows the interior of the chamber 2 to communicate with the interior of an exposure device 6. A wall 291 including an aperture may be provided in the communicating tube 29. The wall 291 may be positioned such that the second focus of the EUV light collector mirror 23 lies in the aperture formed in the wall 291.

The EUV light generation apparatus 1 may further include a laser beam direction control actuator 34, a laser beam collector mirror 22, and a target collector 28 for collecting the droplet 27.

1.2 Operation

With continued reference to FIG. 1, a pulse laser beam 31 outputted from the laser apparatus 3 may pass through the laser beam direction control actuator 34, travel through the window 21 as a pulse laser beam 32, and then enter the chamber 2. The pulse laser beam 32 may travel into the chamber 2 along at least one laser beam path from the laser apparatus 3, be reflected by the laser beam collector mirror 22, and strike at least one target.

The droplet generator 26 may output a droplet target toward the plasma generation site 25 in the chamber 2. The droplet target may be irradiated with at least one pulse of the pulse laser beam 33. Upon being irradiated with the pulse laser beam, the droplet target may be turned into plasma, and EUV light may be emitted from the plasma. Here, one droplet target may be irradiated with a plurality of pulses of the pulse laser beam.

The EUV light generation control system 5 may integrally control the EUV light generation system. The EUV light generation control system 5 may process image data of the droplet 27 captured by a droplet imaging device. Further, the EUV light generation control system 5 may control at least one of the timing when the droplet target 27 is outputted and the direction to which the droplet target 27 is outputted. Furthermore, the EUV light generation control system 5 may control at least one of the timing when the laser apparatus 3 oscillates, the direction in which the pulse laser beam 31 travels, and a change in the position at which the pulse laser beam 31 is focused. It will be appreciated that the various controls mentioned above are merely examples, and other controls may be added as necessary.

2. Slab Amplifier

2.1 Configuration

Figure 2:
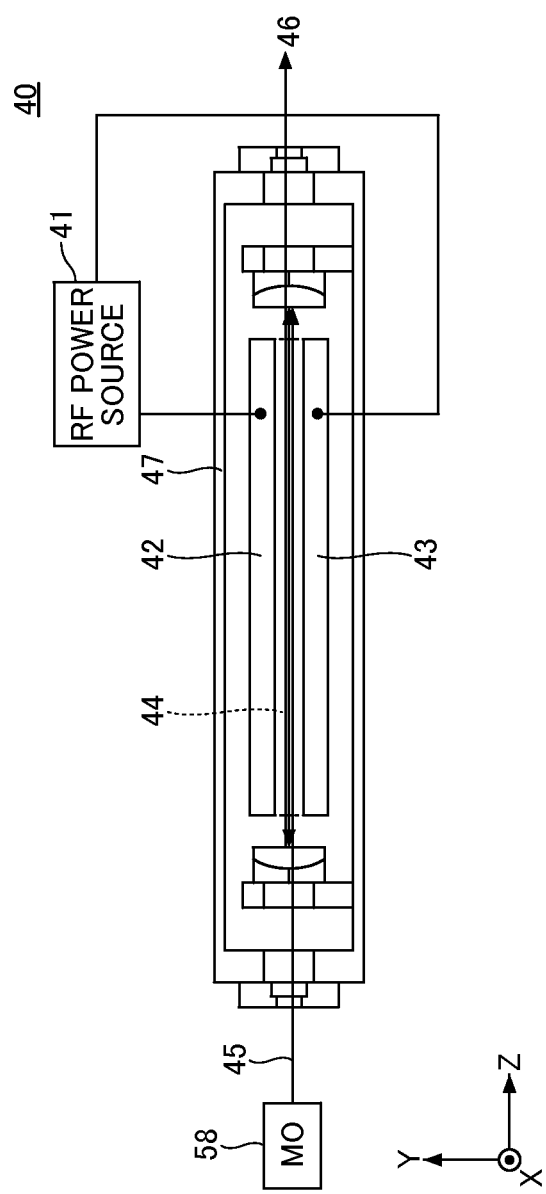
FIG. 2 is a schematic view showing a slab amplifier.
Figure 3:
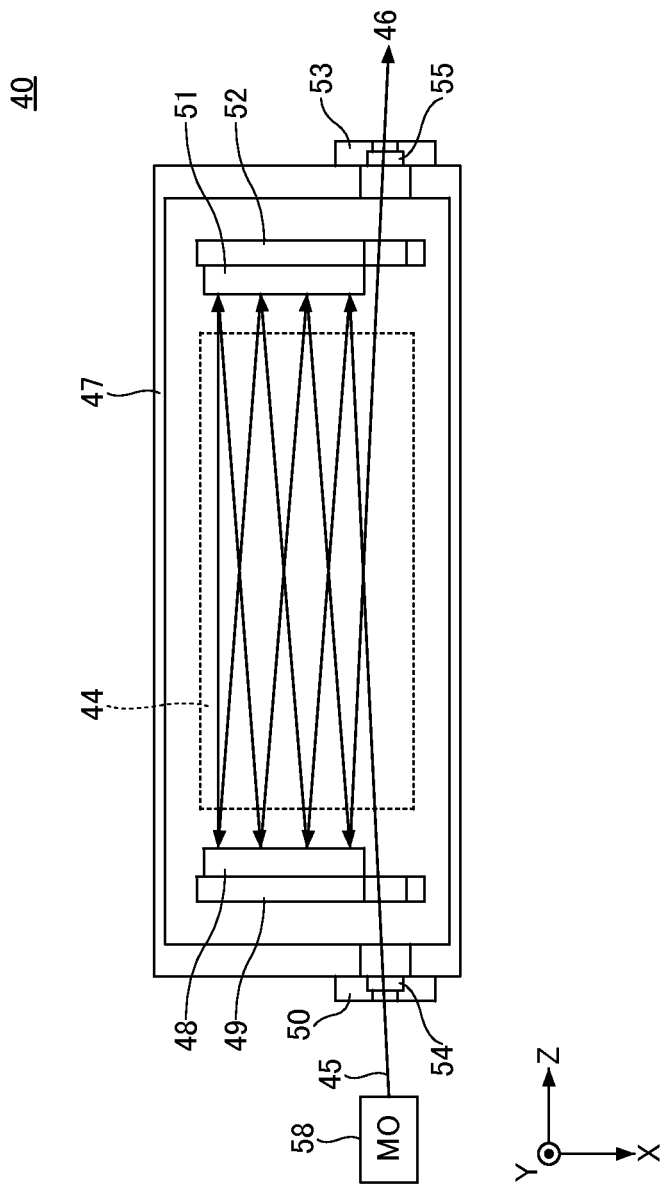
FIG. 3 is a schematic view showing the slab amplifier.

FIGS. 2 and 3 schematically show a slab amplifier 40. In the LPP EUV light generation apparatus 1 shown in FIG. 1, the slab amplifier 40 may be disposed in the laser apparatus 3. Coordinate systems are shown at the lower left in FIGS. 2 and 3, respectively.

The slab amplifier 40 may include a chamber 47 and an RF power source 41. The chamber 47 may include an input-side window holder 50 accommodating an input-side window 54, an output-side window holder 53 accommodating an output-side window 55, a pair of plate electrodes 42 and 43, and an optical system. The slab amplifier 40 may include a first concave mirror 48, a first concave mirror holder 49 configured to hold the first concave mirror 48, a second concave mirror 51, and a second concave mirror holder 52 configured to hold the second concave mirror 51.

A laser gain medium may be sealed in the chamber 47. With the present embodiment, the laser gain medium may be laser gas containing $CO_2$ gas. The chamber 47 may be sealed by the input-side window holder 50 including the input-side window 54 and the output-side window holder 53 including the output-side window 55.

The pair of plate electrodes 42 and 43 may be provided to face one another with a predetermined space in Y-axis direction, and may be connected to the RF power source 41. Each component of the slab amplifier 40 may be located to realize the following steps 1 to 4:

1. A seed beam 45 having entered from the input-side window 54 into a discharge region 44 between the electrode 42 and the electrode 43 is reflected by the second concave mirror 51 at a predetermined reflection angle in the X-Z plane;
2. Next, the beam reflected by the second concave mirror 51 is reflected by the first concave mirror 48 at a predetermined reflection angle in the X-Z plane;
3. Then, by repeating the above-described steps 1 and 2, the beam is reciprocated and therefore travels in a zigzag pattern in the discharge region 44, and is amplified;
4. Finally, the beam having been amplified is outputted from the output-side window 55 as an amplified beam 46.

2.2 Operation

The RF power source 41 may apply a voltage between the electrodes 42 and 43 in the slab amplifier 40. As a result, electric discharge may occur between the electrodes 42 and 43, the discharge region 44 may be formed, and laser gas containing $CO_2$ gas may be excited.

While the laser gas containing $CO_2$ gas is excited, the seed beam 45 as a pulse laser beam enters the chamber 47 via the input-side window 54, and passes through the discharge region 44. The seed beam 45 passing through the discharge region 44 may be amplified and reach the second concave mirror 51.

Next, this amplified beam may be reflected by the second concave mirror 51, and further amplified while travelling across the discharge region 44, and then, reach the first concave mirror 48.

After that, this amplified beam may be reflected by the first concave mirror 48 with high reflectance, and further amplified while travelling across the discharge region 44, and then reach the second concave mirror 51 again.

As described above, this amplified beam is reflected repeatedly and alternately by the first concave mirror 48 and the second concave mirror 51, and therefore travels across the discharge region 44 in a zigzag pattern. For example, in the slab amplifier 40, the amplified beam may be reflected four times each by the first concave mirror 48 and the second concave mirror 51, thereby to form nine beam paths. As a result, this amplified beam may be further amplified.

The amplified beam travelling through the last beam path which is the ninth beam path of the slab amplifier 40 may be outputted via the output-side window 55 as the amplified beam 46.

Here, the seed beam 45 may be a pulse laser beam outputted from a master oscillator (MO) 58 which is a seed light source. Alternatively, when the laser apparatus has the MO 58 and a plurality of amplifiers, the seed beam may be a pulse laser beam amplified by the amplifier in the preceding stage.

2.3 Problem

As an experimental result by the inventors, the self-oscillation was observed in the slab amplifier 40 despite that the seed beam 45 did not enter the chamber 47, under a condition of occurrence of electric discharge between the electrodes 42 and 43 with the RF power source 41 so that the laser gas was excited in the slab amplifier 40. When the seed beam 45 enters the chamber 47 while the self-oscillation occurs in the slab amplifier 40, it may be difficult to perform the amplification of the seed beam 45, which reflects the characteristics of the seed beam 45, such as the pulse waveform.

Figure 4:
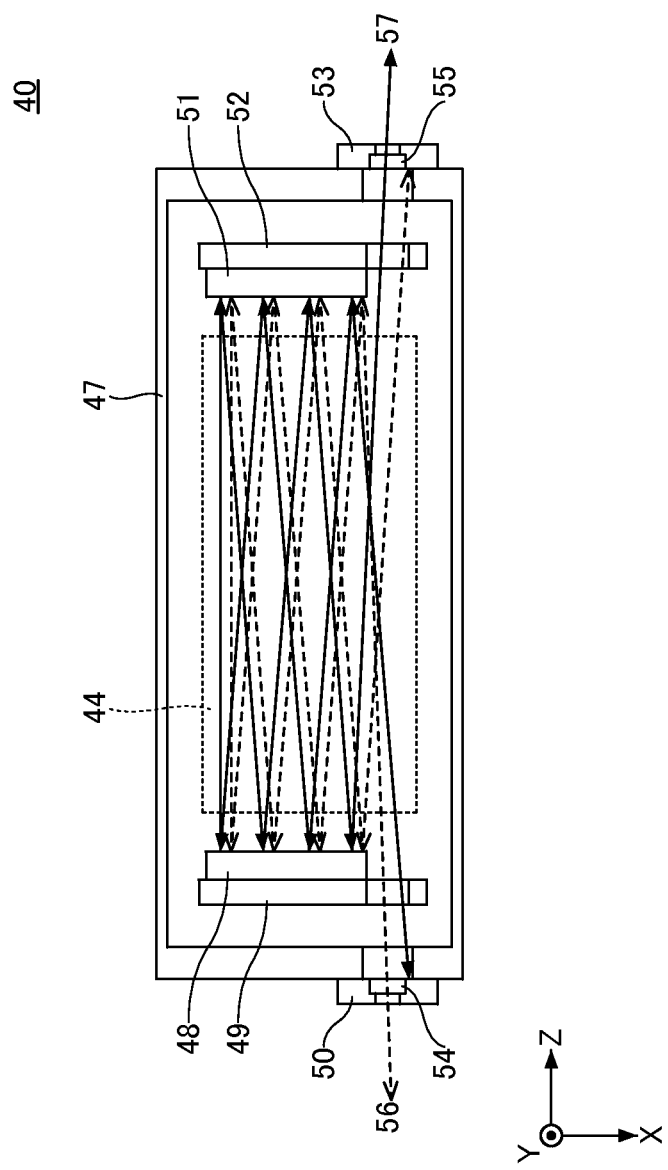
FIG. 4 shows the slab amplifier in which self-oscillation occurs.

FIG. 4 shows beam paths when self-oscillation occurs in the slab amplifier 40. It is presumed that the self-oscillation is caused by reflecting spontaneous emission light generated in the discharge region 44 by reflectors such as the input-side window 54 or the input-side window holder 50 and the output-side window 55 or the output side window holder 53. To be more specific, it may be presumed that the following process progresses:

1. After reflected by the input-side window 54 or the input-side window holder 50 and the output-side window 55 or the output-side window holder 53, spontaneous emission light is reflected by the second concave mirror 51 at a predetermined reflection angle;
2. Next, the light reflected by the second concave mirror 51 is reflected by the first concave mirror 48 at a predetermined reflection angle; and
3. While repeating the above-described steps 1 and 2, the spontaneous emission light is reflected and travels in a zigzag pattern in the discharge region 44, and is amplified.

As a result, it is presumed that self-oscillation beams 56 and 57 pass through the input-side window 54 and the output-side window 55, respectively, and are outputted.

Even if antireflection (AR) coating is applied to the windows 54 and 55, the reflectance is not reduced down to about 0.2% or lower, and therefore the self-oscillation may occur. In addition, the window holders 50 and 53, and the metal parts around them have the reflectance of 50% or more, and therefore reflection of the spontaneous emission light occurs, so that the self-oscillation may occur.

3. Slab Amplifier Configured to Prevent Self-oscillation

3.1 Installation of Aperture Plate to Prevent Laser Beam

Figure 5:
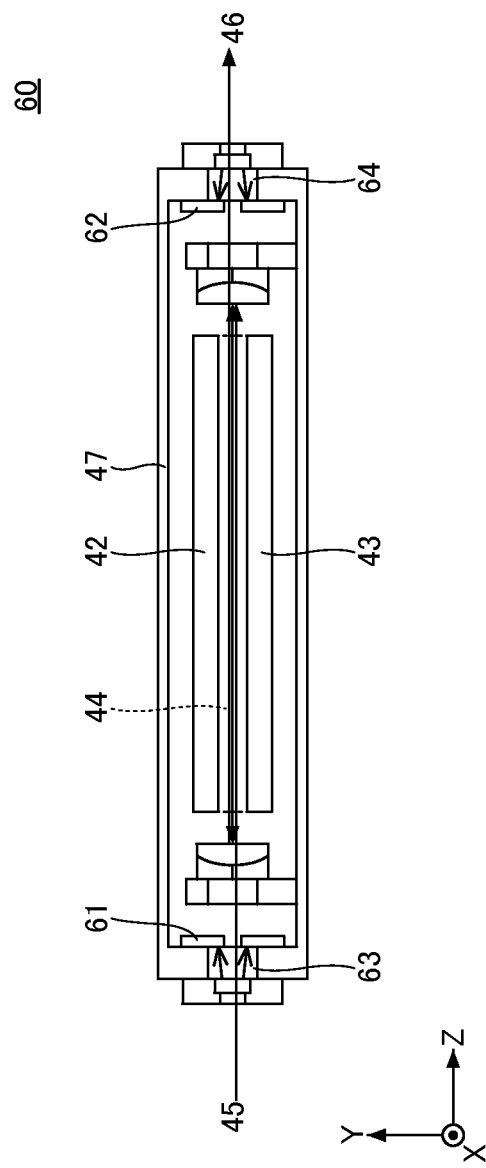
FIG. 5 shows the slab amplifier provided with aperture plates to regulate a laser beam according to one embodiment.
Figure 6:
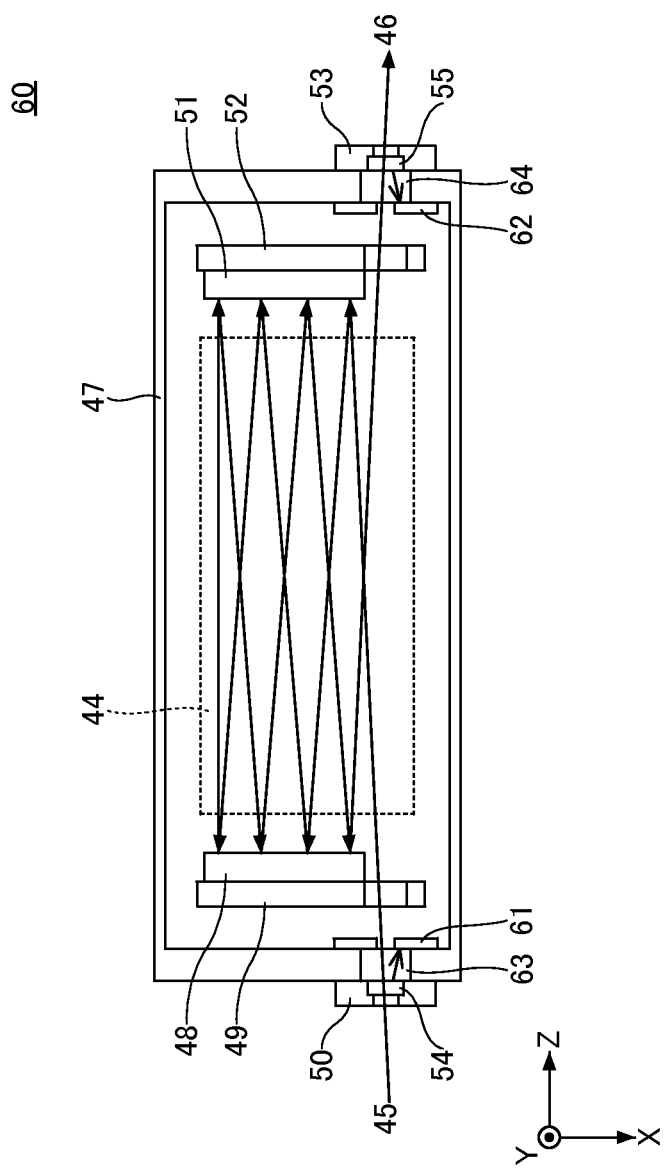
FIG. 6 shows the slab amplifier provided with the aperture plates to regulate laser beam according to one embodiment.
Figure 7:
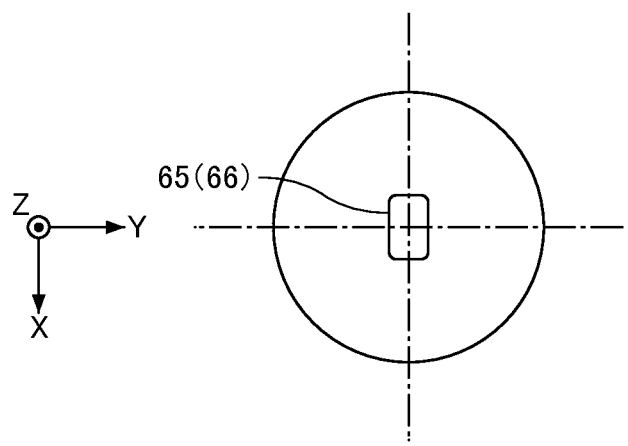
FIG. 7 shows the aperture plates provided in the slab amplifier according to the embodiment shown in FIGS. 5 and 6.

FIGS. 5 and 6 show a slab amplifier 60 provided with aperture plates to prevent laser beam according to an embodiment. FIG. 7 shows an aperture plate provided in the slab amplifier 60 according to the embodiment shown in FIGS. 5 and 6. The slab amplifier 60 shown in FIGS. 5 and 6 is approximately the same as the slab amplifier 40 shown in FIGS. 2 to 4, but is different from the slab amplifier 40 in that aperture plates 61 and 62 each having an opening formed on a designed beam path are provided. Although the aperture plates 61 and 62 are members illustrated separately from the chamber 47 in FIGS. 5 and 6, they may be formed integrally with the chamber 47.

The central axis of a first through-hole 63 provided in the chamber 47 may match the central axis of a first opening 65 of the first aperture plate 61. Moreover, the central axis of a second through-hole 64 may match the central axis of a second opening 66 of the second aperture plate 62.

As shown in FIG. 7, the shape of the first opening 65 and the second opening 66 may be an approximate rectangle having the longer sides in the X-axis direction than the other sides in the Y-axis direction. The shape of the first opening 65 of the first aperture plate 61 and the shape of the second opening 66 of the second aperture plate 62 may be similar to the designed cross-sections of the seed beam 45 and the amplified beam 46 passing through the aperture plate 61 and the aperture plate 62, respectively. The dimension of the first opening 65 and the dimension of the second opening 66 may be an approximately same as, or slightly larger than the designed cross-sections of the seed beam 45 and the amplified beam 46 passing through the aperture plates 61 and 62, respectively. Moreover, the dimension of the first opening 65 and the dimension of the second opening 66 may be smaller than the dimension of the input-side window 54 through which the laser beam passes and the dimension of the output-side window 55 through which the laser beam passes, respectively. When the aperture plates 61 and 62 are formed integrally with the chamber 47, the first through-hole 63 and the second through-hole 64 may function as the first opening 65 and the second opening 66, respectively.

The aperture plates may be made of a metal material containing aluminum. Black alumite treatment may be applied to the surface of each of the aperture plates to reduce the reflectance of $CO_2$ laser beam.

As shown in FIGS. 5 and 6, the seed beam 45 and the amplified beam 46 may pass through the aperture plates 61 and 62, respectively. Meanwhile, most of the spontaneous emission light generated in the discharge region 44 is blocked by the aperture plates 61 and 62. Therefore, the generation of the reflected light by the windows, the holders, or the periphery thereof may reduce. As a result, it is possible to prevent an output of a self-oscillation beam. A reduction in the generation of the reflected light may be realized, for example, by absorbing or scattering the reflected light by the aperture plates 61 and 62.

An experimental result by the inventors showed that the self-oscillation in the slab amplifier 60 with the aperture plates 61 and 62 shown in FIGS. 5 to 7 is reduced down to about 1/15 of the self-oscillation in the slab amplifier 40 without any aperture plate as shown in FIGS. 2 to 4.

The radius of curvature of each of the first concave mirror 48 and the second concave mirror 51 which constitute the optical system of the slab amplifier 60 may be designed such that the image of the seed laser beam at the position of the first aperture plate 61 is transferred to and formed at the position of the second aperture plate 62. Alternatively, the image of the seed laser beam at the position of the first aperture plate 61 may be designed to be formed as the beam waist. This design allows the size of each of the first opening 65 of the aperture plate 61 and the second opening 66 of the aperture plate 62 to be reduced, and therefore it is possible to prevent self-oscillation more reliably.

Each of the aperture plates 61 and 62 may include a silicon substrate coated with carbon nanotubes, carbon, diamond-like carbon (DLC) or a dielectric multilayer. In this way, by absorbing $CO_2$ laser beam by the aperture plates 61 and 62, it is possible to prevent self-oscillation caused by the reflection from the aperture plates 61 and 62.

The aperture plates 61 and 62 may have the thicknesses to prevent the seed beam 45 and the amplified beam 46 from traveling through the first opening 65 and the second opening 66 in a guided mode, respectively. Meanwhile, for example, the part of each of the first opening 65 and the second opening 66 in the beam path side may be thinner than the other part and formed as a knife-edge.

Figure 8:
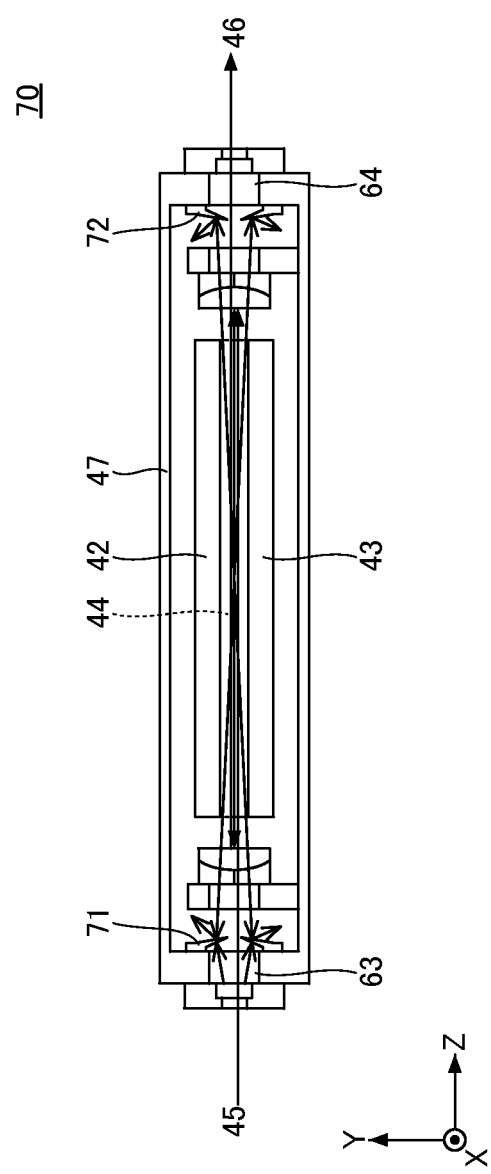
FIG. 8 shows the slab amplifier provided with V-shaped aperture plates according to one embodiment.
Figure 9:
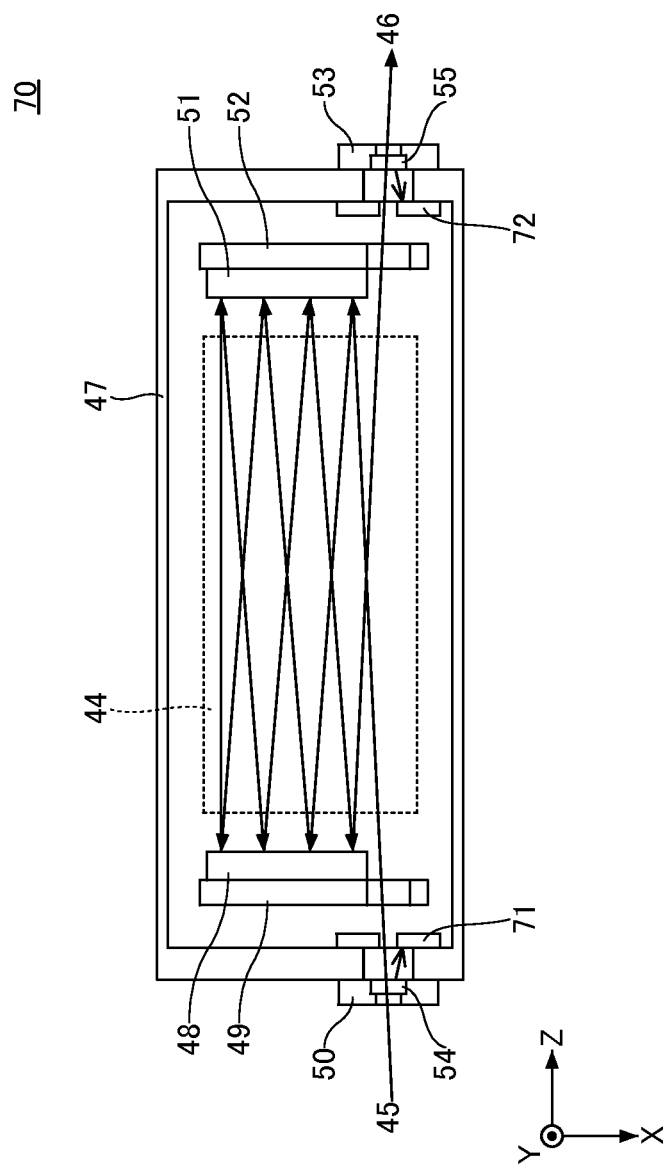
FIG. 9 shows the slab amplifier provided with the V-shaped aperture plates according to the embodiment.
Figure 10:
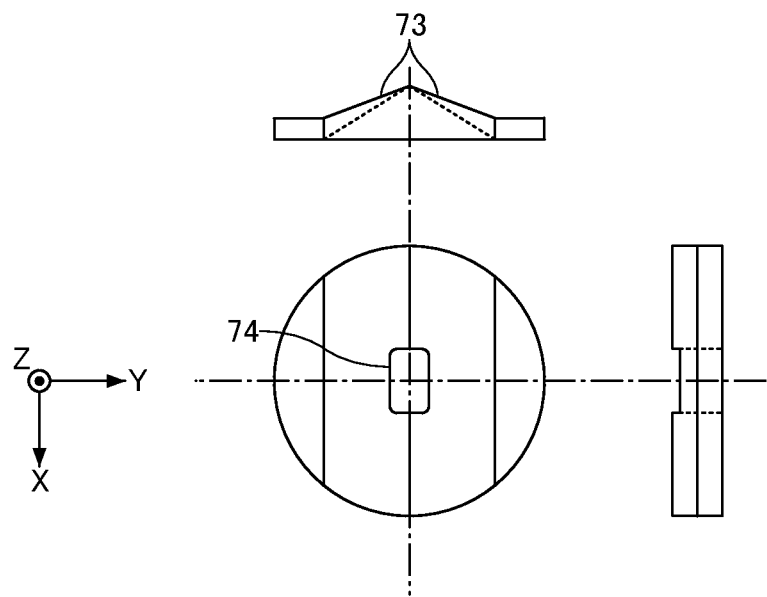
FIG. 10 shows the V-shaped aperture plates provided in the slab amplifier according to the embodiment shown in FIGS. 5 and 6.

FIGS. 8 and 9 show a slab amplifier 70 according to an embodiment, which has V-shaped aperture plates 71 and 72 instead of the aperture plates 61 and 62. FIG. 10 shows the V-shaped aperture plates 71 and 72. The V-shaped aperture plates 71 and 72 shown in FIG. 8 are provided such that a blade 73 of each of the aperture plates 71 and 72 is inclined at a certain angle with respect to the plane perpendicular to the central axis of the beam path of the laser beam passing through the opening. By this means, it is possible to prevent the beam reflected by the blade 73 from entering the discharge region 44.

Figure 11:
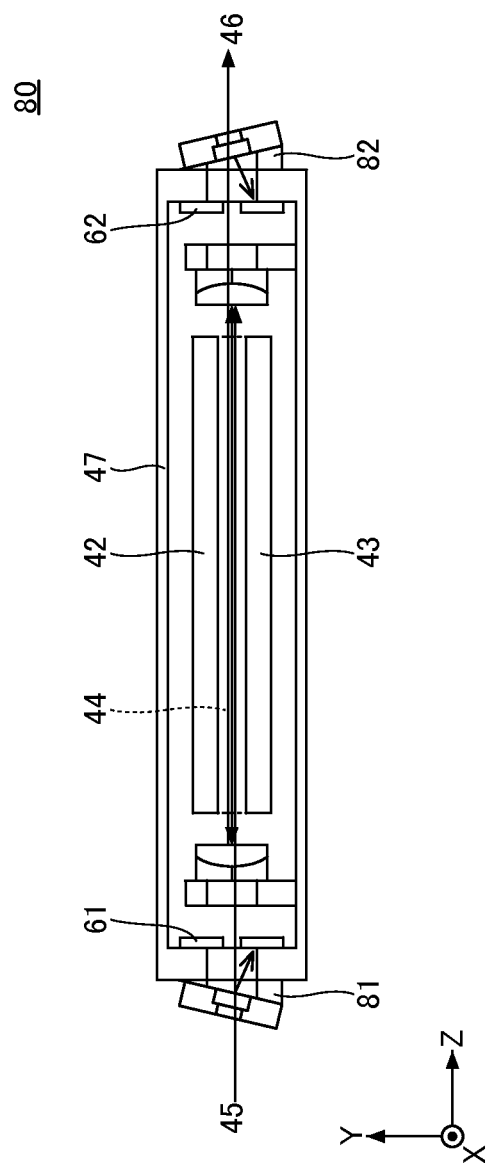
FIG. 11 shows the slab amplifier provided such that holders including windows are inclined with respect to a seed beam and an amplified beam at predetermined angles, respectively, according to one embodiment.
Figure 12:
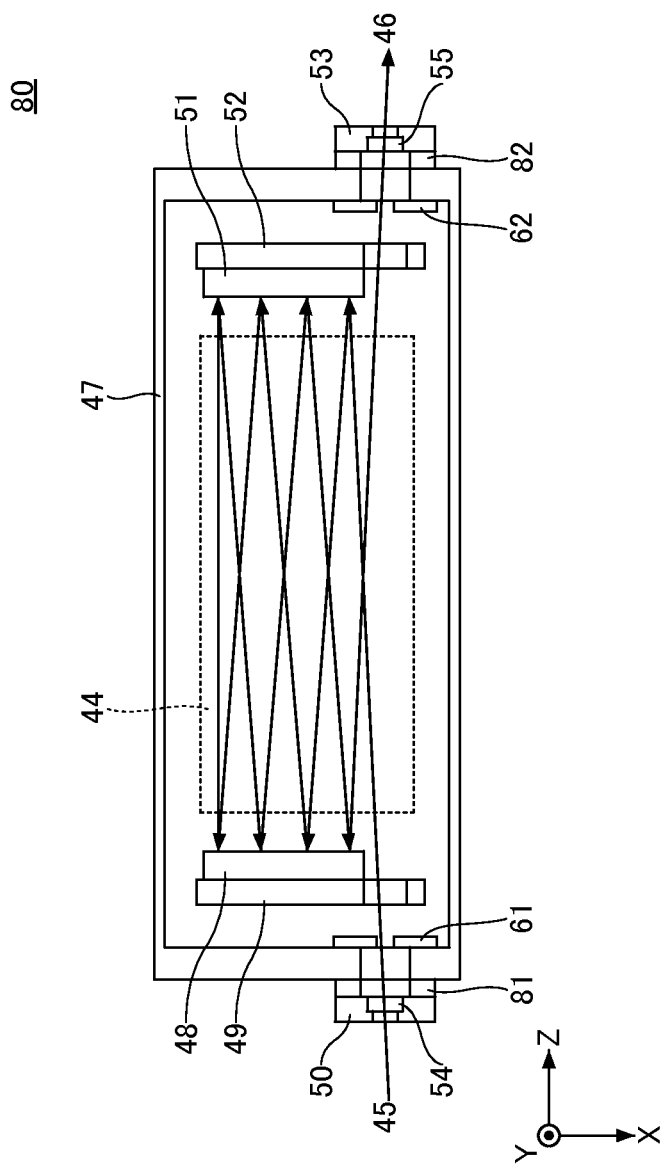
FIG. 12 shows the slab amplifier provided such that the holders including the windows are inclined with respect to the seed beam and the amplified beam at the predetermined angles, respectively, according to the embodiment.

3.2 Mounting Angle of Holder Including Window to Prevent Reflected Light from Entering Discharge Region FIGS. 11 and 12 show a slab amplifier 80 having the aperture plates 61 and 62 according to an embodiment, where each of holders 81 and 82 including a window is inclined at a predetermined angle with respect to the central axis of the beam path of the seed beam 45 and the amplified beam 46.

The slab amplifier 80 shown in FIGS. 11 and 12 is approximately the same as the slab amplifiers 60 and 70 shown in FIGS. 5 to 10, but is different from the slab amplifiers 60 and 70 in that the holders 50 and 53 including the windows are inclined with respect to the plane perpendicular to the central axis of the beam path of the laser beam passing through the through-holes of the chamber 47.

The input-side window holder 50 including the input-side window 54 and the output-side window holder 53 including the output-side window 55 may be provided via a first holder cradle 81 and a second holder cradle 82 to be inclined with respect to the plane perpendicular to the central axis of the beam path of the laser beam passing through the first through-hole 63 and the second through-hole 64, respectively, in order to prevent the reflected light from entering the discharge region 44. The input-side window holder 50 may be formed integrally with the first holder cradle 81. The output-side window holder 53 may be formed integrally with the second holder cradle 82.

The seed beam 45 and the amplified beam 46 may pass through the aperture plates 61 and 62, respectively and therefore the seed beam 45 may be amplified. On the other hand, most of the spontaneous emission light is blocked by the aperture plates 61 and 62, and therefore it is possible to reduce the reflected light from the windows, the holders, or the periphery thereof. As a result, it is possible to prevent an output of a self-oscillation beam.

Moreover, the spontaneous emission light having passed through the respective openings of the aperture plates 61 and 62 may enter the windows 54 and 55, and be partly reflected. As shown in FIG. 11, mechanical vignetting by the aperture plates 61 and 62 may prevent the reflected light from entering the discharge region 44. As a result, it is possible to prevent self-oscillation more reliably.

An experimental result by the inventors showed that the output of the self-oscillation in the slab amplifier 80 with the inclined windows 54 and 55 is further reduced down to about 1/10 of the output of the self-oscillation in the slab amplifiers 60 and 70 without any inclined window shown in FIGS. 5 to 10.

In FIG. 11, the input-side window 54 and the output-side window 55 are inclined in the directions different from one another, with respect to the plane perpendicular to the central axis of the beam path of the laser beam passing through the through-holes. However, it is by no means limiting. The input-side window 54 and the output-side window 55 may be inclined in the same direction, with respect to the plane perpendicular to the central axis of the beam path of the laser beam passing through the through-holes. In addition, another configuration is possible where the input-side window 54 and the output-side window 55 are inclined with respect to an axis other than the Z-axis, for example, inclined with respect to the X-axis or the Y-axis as the axis of rotation.

By providing the windows 54 and 55 in this way, when, for example, two slab amplifiers are arranged in series, it is possible to prevent the reflected light from the output-side window of the first slab amplifier and the reflected light from the input-side window of the second slab amplifier from entering the respective amplifiers.

3.3 Installation of Container to Absorb Reflected Light

Figure 13:
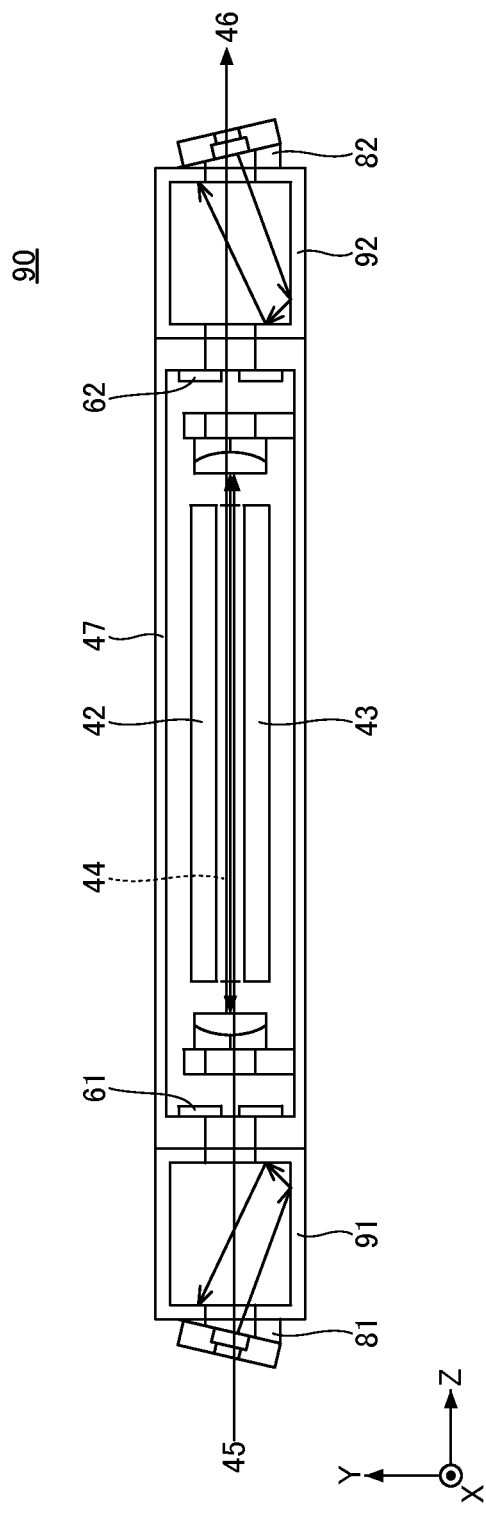
FIG. 13 shows the slab amplifier with a container provided between each window and the chamber according to one embodiment.
Figure 14:
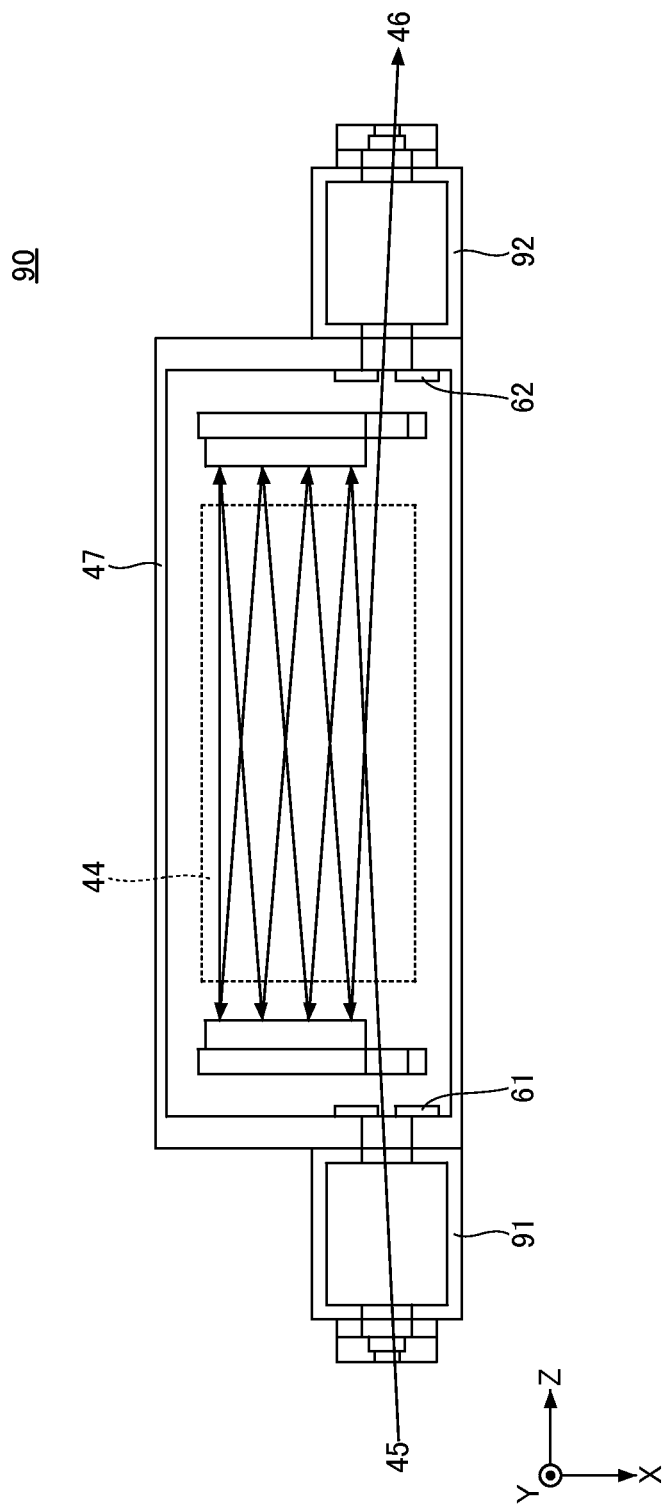
FIG. 14 shows the slab amplifier with the container provided between each window and the chamber according to the embodiment.

FIGS. 13 and 14 show a slab amplifier 90 having containers 91 and 92 each provided between the chamber 47 and the window.

The slab amplifier 90 shown in FIGS. 13 and 14 is approximately the same as the slab amplifier 80 shown in FIGS. 11 and 12, but is different from the slab amplifier 80 in that the containers 91 and 92 each having two openings are provided between the first holder cradle 81 and the chamber 47, and between the second holder cradle 82 and the chamber 47, respectively.

The openings of each of the containers 91 and 92 may be of sufficient size to allow the seed beam 45 and the amplified beam 46 to pass through.

The containers may be made of a metal material containing aluminum. The black alumite treatment may be applied to the surface of each of the containers to reduce the reflectance of $CO_2$ laser beam. More preferably, the containers may include silicon substrates, and the silicon substrates may be coated with carbon nanotubes.

The seed beam 45 and the amplified beam 46 may pass through the openings of the aperture plates 61 and 62, respectively, and therefore the seed beam 45 may enter the discharge region 44, and be amplified. On the other hand, most of the spontaneous emission light is blocked by the aperture plates 61 and 62, and therefore the reflected light from the windows, the holders, or the periphery thereof may be reduced. As a result, it is possible to prevent an output of a self-oscillation beam.

Moreover, the spontaneous emission light having passed through the respective openings of the aperture plates 61 and 62 may enter the windows, and be partly reflected by the windows. As shown in FIG. 13, the light beams reflected by the windows may enter the walls of the containers 91 and 92, respectively.

After that, the light having entered the containers 91 and 92 may be absorbed and attenuated every time the light is reflected by the walls. For example, black alumite-coated aluminum has about a reflectance of 3% for $CO_2$ laser beam. Therefore, for example, when the spontaneous emission light is reflected three times in the container, the reflected spontaneous emission light is attenuated to 0.0027%. As a result, it is possible to prevent self-oscillation more reliably than with the configuration shown in FIGS. 11 and 12.

The containers 91 and 92 may include silicon substrates, and the silicon substrates may be coated with carbon nanotubes. This coating has the reflectance of 1 to 2% or lower, and therefore it is possible to prevent self-oscillation more reliably.

The black alumite treatment may be applied to the holders of the windows, the holder cradles, the aperture plates 61 and 62, and the inner surfaces of the through-holes of the chamber. When a component irradiated with spontaneous emission light or the reflected spontaneous emission light is not made of aluminum, a black alumite-coated aluminum part may be provided on the surface of the portion of the component into which the light enters. When the black alumite treatment is performed, it is preferable to apply sealing treatment to seal pores in the alumite-coated surface with inorganic dye.

Meanwhile, when the containers 91 and 92 are configured to sufficiently reduce the reflected light from the windows or the holders, the first aperture plate 61 and the second aperture plate 62 may not be needed.

3.4 Installation of Labyrinth

Figure 15:
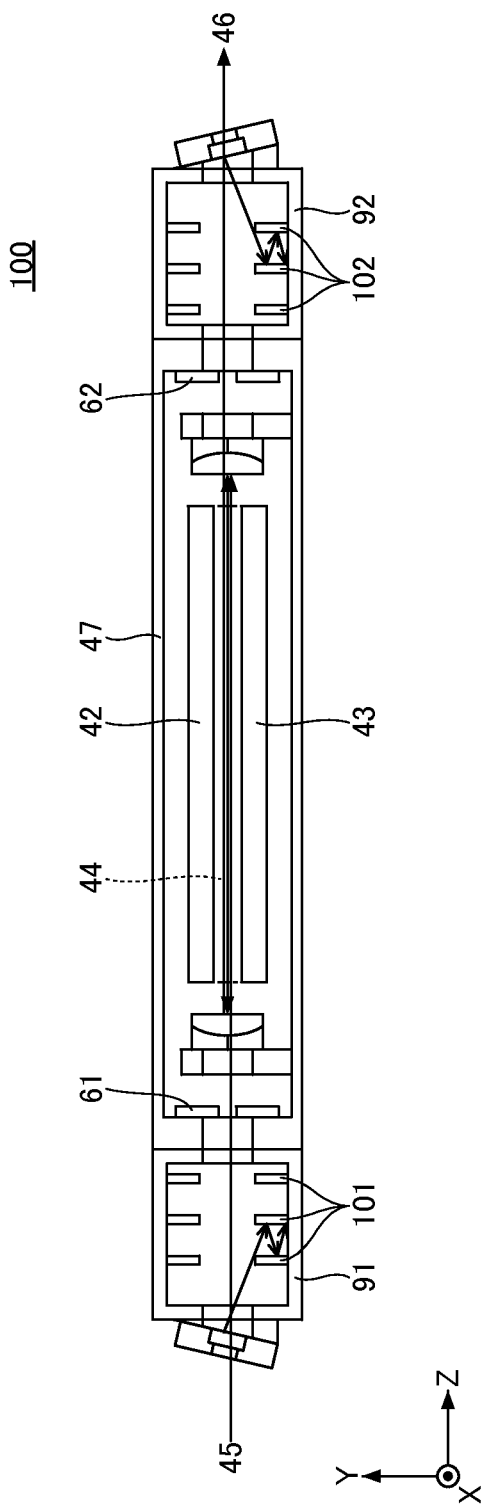
FIG. 15 shows the slab amplifier with the containers each having a labyrinth according to one embodiment.
Figure 16:
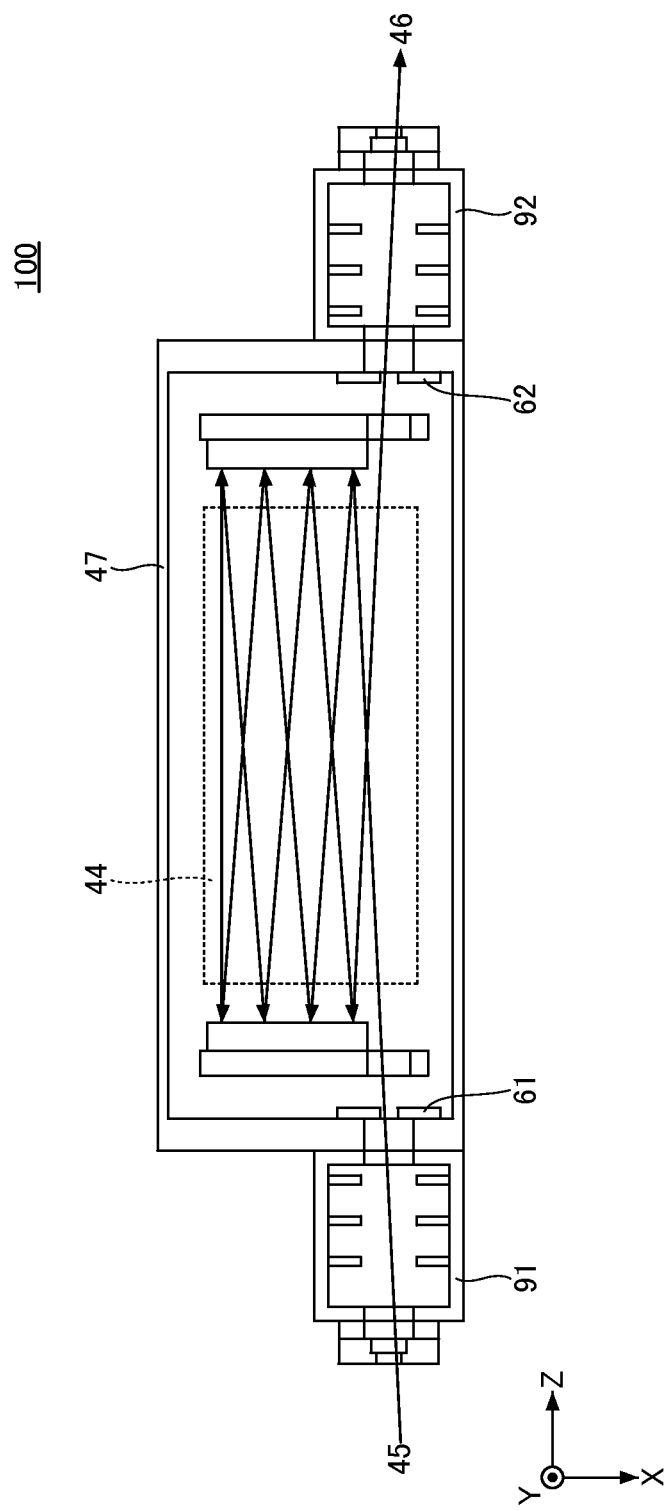
FIG. 16 shows the slab amplifier with the containers each having the labyrinth according to the embodiment.

FIGS. 15 and 16 show a slab amplifier 100 having the containers 91 and 92 each including a labyrinth according to an embodiment. The slab amplifier 100 shown in FIGS. 15 and 16 is approximately the same as the slab amplifier 90 shown in FIGS. 13 and 14, but is different from the slab amplifier 90 in that labyrinths 101 and 102 are provided in the containers 91 and 92, respectively.

Each of the labyrinths 101 and 102 may be constituted by a plurality of aperture plates. The slab amplifier 100 may be configured such that the center of the openings of the plurality of aperture plates matches the center of the designed beam path of the seed beam 45 and the amplified beam 46.

The dimension of the opening of each of the plurality of aperture plates of the labyrinth 101 may be greater than the cross-section of the seed beam 45 passing through each of the aperture plates of the labyrinth 101, meanwhile the dimension of the opening of each of the plurality of aperture plates of the labyrinth 102 may be greater than the cross-section of the amplified beam 46 passing through each of the aperture plates of the labyrinth 102.

The plurality of aperture plates of the labyrinths 101 and 102 may be made of aluminum. The black alumite treatment may be applied to the surfaces of the aperture plates.

The reflected light from the windows or the holders may be attenuated while being reflected by the labyrinths several times. As a result, the reflected light from the windows or the holders may be reduced more than with the configuration shown in FIGS. 13 and 14.

When the labyrinths 101 and 102 in the containers 91 and 92 may sufficiently reduce the reflected light from the windows or the holders, the first aperture plate 61 and the second aperture plate 62 may not be needed.

Figure 17:
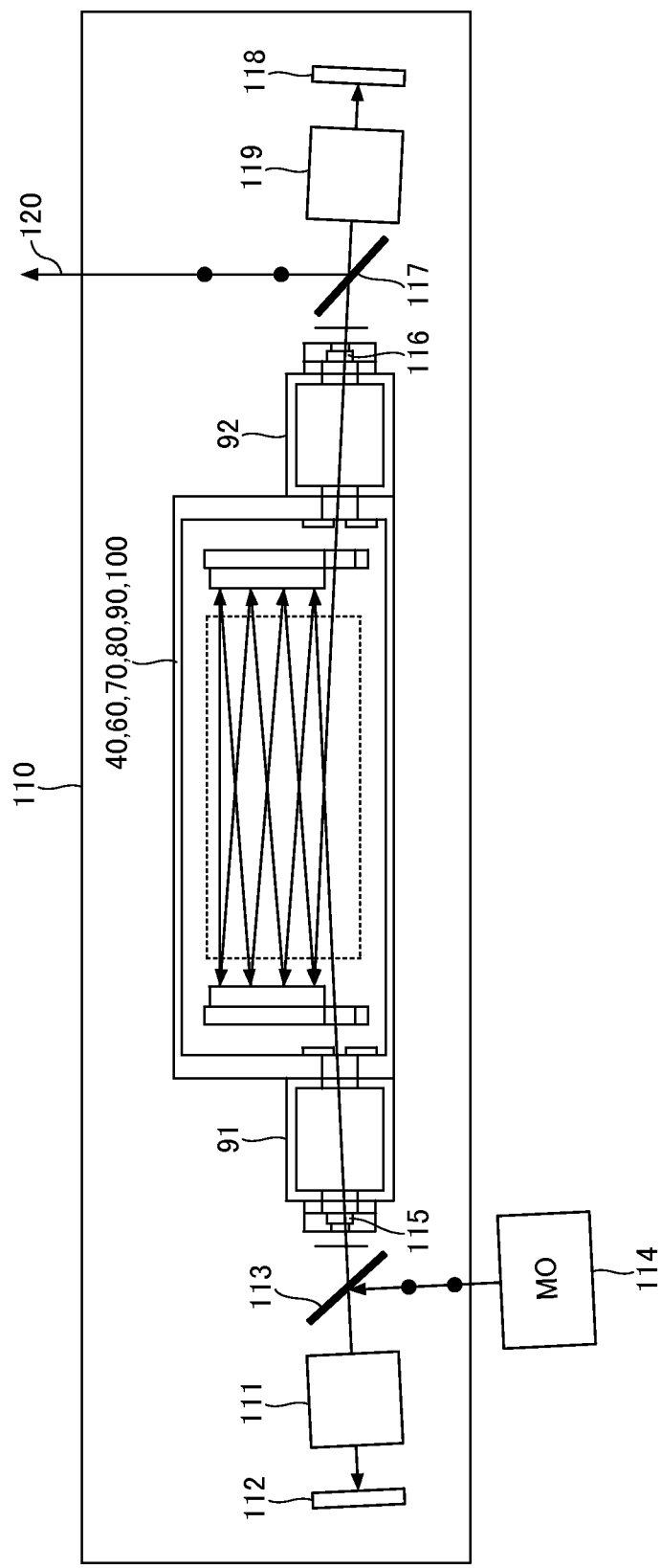
FIG. 17 shows a laser apparatus including a regenerative amplifier to which the slab amplifier according to one embodiment of the present disclosure is applicable.

4. Application of Slab Amplifier 4.1 Regenerative Amplifier Including Slab Amplifier FIG. 17 shows the laser apparatus including a regenerative amplifier 110 to which the slab amplifier according to the present embodiment is applicable. This laser apparatus may include an MO 114, and a regenerative amplifier 110 including the slab amplifier according to the present embodiment. Although with the present embodiment, the illustrated slab amplifier includes the containers 91 and 92, a slab amplifier without the containers 91 and 92 may be applied to the regenerative amplifier 110.

The regenerative amplifier 110 may include a first high-reflection mirror 112, a second high-reflection mirror 118, a first EO Pockels cell 111, a second EO Pockels cell 119, a first polarizer 113, a second polarizer 117, and any one of the slab amplifiers 40, 60, 70, 80, 90 and 100.

The MO 114 may be a quantum cascade laser (QCL) that oscillates and emits a laser beam at the wavelength of a $CO_2$ laser beam. The MO 114 may output a pulse laser beam in the polarization direction perpendicular to, for example, the plane of the drawing.

Each of the EO Pockels cells 111 and 119 containing an electro-optic crystal may be connected to a power source (not shown). When the power source is turned on, a voltage is applied to the electro-optic crystal, and the EO Pockels cell may convert the polarization state of the laser beam incident on the electro-optic crystal and output the laser beam. Meanwhile, when the power source (not shown) is turned off, each of the EO Pockels cells 111 and 119 may allow the laser beam incident on the electro-optic crystal to pass through without converting the polarization state.

The pulse laser beam outputted from the MO 114 may be reflected by the first polarizer 113, enter and pass through the first EO Pockels cell 111 with the power source tuned on, and therefore be converted into circularly polarized light. Next, the pulse laser beam having been converted into the circularly polarized light may be returned by the first high-reflection mirror 112, pass through the first EO Pockels cell 111 with the power source turned on again, and then be converted into a laser beam in the polarization direction parallel to the plane of the drawing.

This pulse laser beam enters from the first window 115 into the discharge region of the slab amplifier via the container. Next, the pulse laser beam having entered the discharge region is reflected at a predetermined reflection angle by the second concave mirror, and then reflected at a predetermined reflection angle by the first concave mirror in the slab amplifier. By repeating this reflection by the first concave mirror and the second concave mirror, the pulse laser beam having entered the discharge region may be amplified. As a result, the amplified pulse laser beam in the polarization direction parallel to the plane of the drawing may be outputted from the second window 116.

This pulse laser beam in the polarization direction parallel to the plane of the drawing, which has been outputted from the second window, may pass through the second polarizer 117 with high transmittance, and pass through the second EO Pockels cell 119 with the voltage turned off. After that, the pulse laser beam having been polarized in the direction parallel to the plane of the drawing may be returned by the second high-reflection mirror 118, pass through the second EO Pockels cell 119 with the voltage turned off again, and then pass through the second polarizer 117 with high transmittance.

After having passed through the second polarizer 117 with high transmittance, the pulse laser beam polarized in the direction parallel to the plane of the drawing may enter from the second window 116 into the discharge region in the slab amplifier. Next, the pulse laser beam having entered the discharge region may be reflected at a predetermined reflection angle by the first concave mirror, and then be reflected at a predetermined reflection angle by the second concave mirror in the slab amplifier. By repeating the reflection by the first concave mirror and the second concave mirror, the pulse laser beam having entered the discharge region may be amplified. As a result, an amplified beam may be outputted to the first window 115 side.

Moreover, this amplified pulse laser beam may pass through the first polarizer 113 and the first EO Pockels cell 111 with the voltage turned off, be reflected by the first high-reflection mirror 112 with high reflectance, and pass through the first EO Pockels cell 111 with the voltage turned off and the first polarizer 113 with high transmittance again.

As described above, the pulse laser beam outputted from the MO 114 may reciprocate between the first high-reflection mirror 112 and the second high-reflection mirror 118 constituting a resonator, and be amplified.

After the pulse laser beam outputted from the MO 114 is reciprocated in this resonator and therefore is amplified up to a predetermined energy, the power source is turned on. By this means, the second EO Pockels cell 119 may convert the polarization state of the amplified pulse laser beam from the polarization in the horizontal direction into the polarization in the vertical direction. By this means, the pulse laser beam having been converted and therefore polarized in the vertical direction may be reflected by the second polarizer 117 with high reflectance, and therefore may be outputted to the outside of the resonator as a regenerative amplified laser beam 120.

4.2 EUV Light Generation Apparatus Including Slab Amplifier

Figure 18:
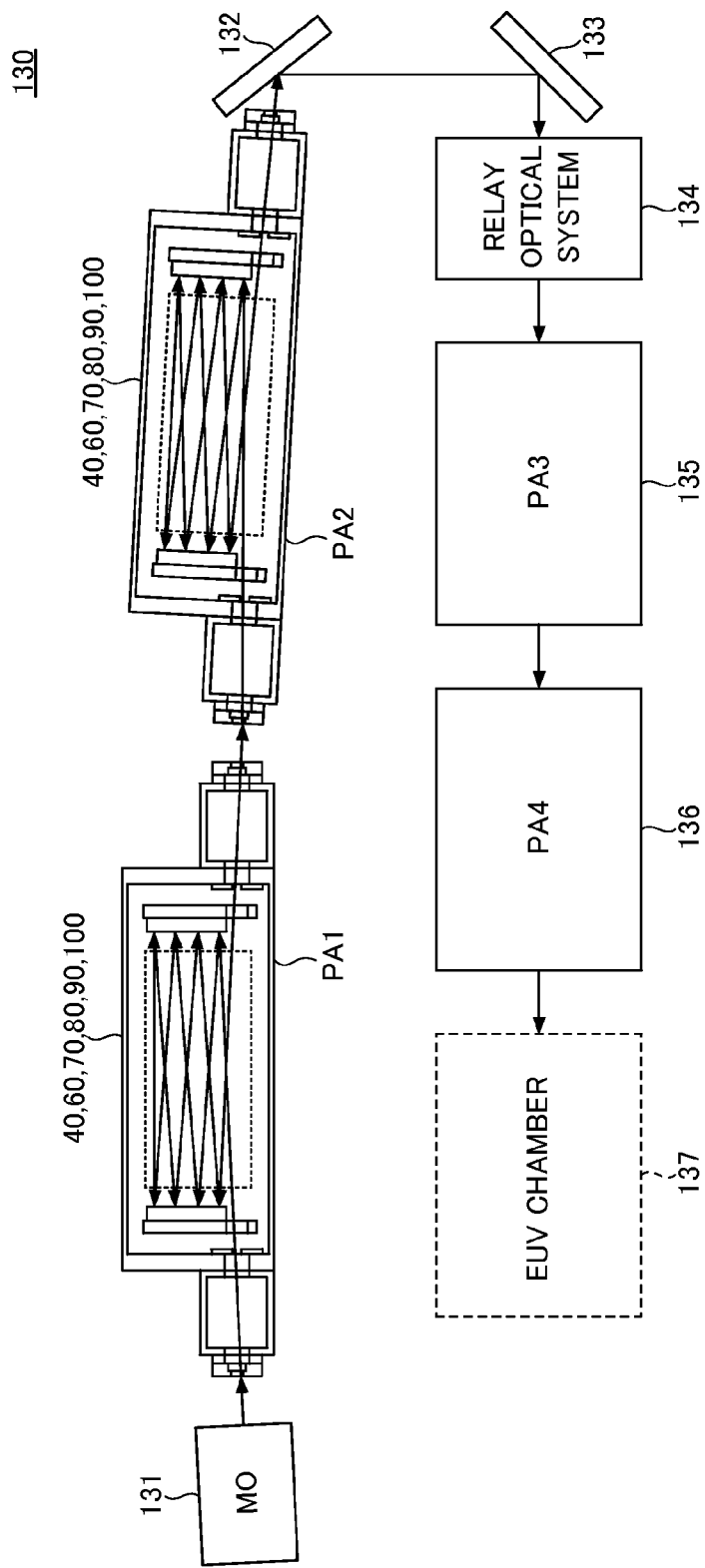
FIG. 18 shows the laser apparatus including the slab amplifier according to the embodiment of the present disclosure.

FIG. 18 shows a laser apparatus 130 including the slab amplifier according to the present embodiment.

The laser apparatus 130 for an LPP EUV light generation apparatus may include at least one slab amplifier. The laser apparatus 130 may include an MO 131, a first slab amplifier (PA1), a second slab amplifier (PA2), a first high-reflection mirror 132, a second high-reflection mirror 133, a relay optical system 134, a PA3, and a PA4. Although with the present embodiment, the illustrated slab amplifiers PA1 and PA2 each include the containers 91 and 92, a slab amplifier without the containers 91 and 92 may be applied to the laser apparatus 130.

The first slab amplifier and the second slab amplifier may be continuously arranged in series. The PA3 and the PA4 may be fast-axial-flow amplifiers. The relay optical system 134 may convert the shape of the laser beam outputted from the first and second slab amplifiers into the shape that matches the discharge region of the PA3.

The above-described embodiments and the modifications thereof are merely examples for implementing the present disclosure, and the present disclosure is not limited thereto. Making various modifications according to the specifications or the like falls within the scope of the present disclosure, and it is apparent from the above description that other various embodiments are possible within the scope of the present disclosure.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

REFERENCE SIGNS LIST 1 laser produced plasma (LPP) EUV light generation apparatus
2 chamber
3 laser apparatus
4 target imaging device
5 EUV light generation control system
6 exposure device
21 window
22 laser beam collector mirror
23 EUV light collector mirror 24 through-hole
25 plasma generation site
26 droplet generator
27 droplet
28 target collector
32 pulse laser beam
33 pulse laser beam
34 actuator
40 slab amplifier
41 RF power source
42 plate electrode
43 plate electrode
44 discharge region
45 seed beam
46 amplified beam
47 chamber
48 first concave mirror
49 first concave mirror holder
50 input-side window holder
51 second concave mirror
52 second concave mirror holder
54 input-side window
55 output-side window
56 self-oscillation beam
57 self-oscillation beam
58 master oscillator (MO)
60 slab amplifier
61 aperture plate
62 aperture plate
63 first through-hole
64 second through-hole
65 first opening
66 second opening
70 slab amplifier
80 slab amplifier
81 first holder
82 second holder
90 slab amplifier
91 first container
92 second container
100 slab amplifier
101 labyrinth
102 labyrinth
110 regenerative amplifier
111 first EO Pockels cell
112 first high-reflection mirror
113 first polarizer
114 master oscillator (MO)
117 second polarizer
118 second high-reflection mirror
119 second EO Pockels cell
120 regenerative amplified laser beam
130 laser apparatus
131 master oscillator
132 first high-reflection mirror
133 second high-reflection mirror
134 relay optical system
135 slab amplifier
136 slab amplifier
137 EUV chamber
291 wall
292 intermediate focus (IF)

The invention claimed:

1. A slab amplifier configured to receive a seed beam outputted from a seed light source and to amplify the seed beam, the slab amplifier comprising:
a chamber having a first through-hole and a second through-hole and accommodating a laser gain medium;
a pair of plate electrodes, disposed to face one another with a predetermined space between the pair of plate electrodes, in the chamber;
a first window provided to seal the first through-hole;
a first window holder configured to hold the first window such that a normal line of the first window is inclined in a first direction with respect to a first plane;
a second window provided to seal the second through-hole;
a second window holder configured to hold the second window such that a normal line of the second window is inclined in a direction different from the first direction with respect to the first plane; and
an optical system configured to reflect the seed beam having entered the chamber through the first window and to allow the reflected seed beam to be repeatedly reflected between the pair of electrodes and to be outputted to the chamber through the second window,
wherein the first plane includes a central axis of a beam path of the seed beam having entered the optical system and a central axis of a beam path of the seed beam reflected from the optical system,
the slab amplifier further including:
a first aperture plate provided between the first window and the electrodes, and having an opening of a dimension equal to or greater than a cross-section of the seed beam and equal to or smaller than a dimension of the first window; and
a second aperture plate provided between the second window and the electrodes, and having an opening of a dimension equal to or greater than a cross-section of the amplified beam and equal to or smaller than a dimension of the second window,
wherein a shape of the opening of the first aperture plate and the opening of the second aperture plate is a rectangle having a longer side in a direction in which the first plane extends.

2. The slab amplifier according to claim 1 further comprising:
a first container provided between the first window with the first window holder and the chamber,
the first container including:
a first input-side opening aligned with the first through-hole;
a second input-side opening provided to face the first input-side opening; and
a wall configured to absorb light; and
a second container provided between the second window with the second window holder and the chamber,
the second container including:
a first output-side opening aligned with the second through-hole;
a second output-side opening provided to face the first output-side opening; and
a wall configured to absorb light.

3. A laser apparatus, comprising:
a seed light source configured to output a seed beam; and
a plurality of slab amplifiers according to claim 1, arranged in series, configured to receive the seed beam outputted from the seed light source and to amplify the seed beam.

* * * * *